US012358698B2

(12) United States Patent
Prodromou et al.

(10) Patent No.: US 12,358,698 B2
(45) Date of Patent: Jul. 15, 2025

(54) DISPENSER

(71) Applicants: Phrixos Prodromou, Middlesex (GB); Ayhan Ogretici, Watford (GB)

(72) Inventors: Phrixos Prodromou, Middlesex (GB); Ayhan Ogretici, Watford (GB)

( * ) Notice: Subject to any disclaimer, the term of this patent is extended or adjusted under 35 U.S.C. 154(b) by 508 days.

(21) Appl. No.: 17/619,545

(22) PCT Filed: Jun. 12, 2020

(86) PCT No.: PCT/GB2020/051419
§ 371 (c)(1),
(2) Date: Dec. 15, 2021

(87) PCT Pub. No.: WO2020/260856
PCT Pub. Date: Dec. 30, 2020

(65) Prior Publication Data
US 2022/0306356 A1  Sep. 29, 2022

(30) Foreign Application Priority Data

Jun. 24, 2019 (GB) ..................... 1909007

(51) Int. Cl.
*B65D 50/04* (2006.01)
*B65D 35/10* (2006.01)
(Continued)

(52) U.S. Cl.
CPC .......... *B65D 50/048* (2013.01); *B65D 35/10* (2013.01); *B65D 35/30* (2013.01); *B65D 35/46* (2013.01); *B65D 2215/02* (2013.01)

(58) Field of Classification Search
CPC .... B65D 41/06; B65D 41/26; B65D 2215/02; B65D 50/046; B65D 50/04; B65D 50/041; G01F 11/286
(Continued)

(56) References Cited

U.S. PATENT DOCUMENTS 3,910,442 A * 10/1975 Gargano ................ B65D 41/06
215/221
4,077,547 A * 3/1978 Donoghue ............ G01F 11/286
222/207
(Continued)

FOREIGN PATENT DOCUMENTS

CN         205515603 U    8/2016
DE         20208450 U1    1/2004
(Continued)

OTHER PUBLICATIONS

Great Britain Patent Application No. GB1909007.5 Combined Search and Examination report under Sections 17 and 18(3), Dec. 18, 2019, 8 pages.
(Continued)

*Primary Examiner* — Charles P. Cheyney
(74) *Attorney, Agent, or Firm* — Leber IP Law; Celia H. Leber

(57) ABSTRACT

A measurable dispenser, comprising a first vessel for containing a substance to be dispensed, a second, measurable, vessel, mounted on the first vessel, a one-way valve whereby fluid from the first vessel can be caused to move into the second vessel and retained therein virtue of the one-way valve, and wherein the second vessel is provided with one or more indicia indicating measured amounts. A child-proof locking mechanism is also disclosed.

12 Claims, 14 Drawing Sheets

(51) Int. Cl.
*B65D 35/30* (2006.01)
*B65D 35/46* (2006.01)

(58) Field of Classification Search
USPC .................. 222/207, 205, 211, 158, 212
See application file for complete search history.

(56) References Cited

U.S. PATENT DOCUMENTS

| | | | |
|---|---|---|---|
| 4,105,142 A | 8/1978 | Morris, Jr. | |
| 4,607,762 A * | 8/1986 | Zulauf .................. | B65D 1/323 222/521 |
| 4,875,603 A | 10/1989 | Weinstein | |
| 4,971,226 A * | 11/1990 | Donoghue .............. | B29C 45/33 222/207 |
| 4,998,632 A * | 3/1991 | Morris, Sr. .......... | B65D 50/041 215/220 |
| 5,020,681 A * | 6/1991 | Kusz .................... | B65D 50/041 215/220 |
| 5,253,788 A * | 10/1993 | Vandromme ......... | G01F 11/025 222/321.6 |
| 5,261,569 A * | 11/1993 | Sandwell .............. | G01F 11/286 222/158 |
| 5,381,930 A * | 1/1995 | Kalabakas ............ | G01F 11/286 222/205 |
| 5,967,377 A * | 10/1999 | Glynn .................... | B65D 41/26 222/320 |
| 6,435,231 B1 | 8/2002 | Cooper et al. | |
| 6,450,352 B1 | 9/2002 | Dejonge | |
| 7,017,782 B2 * | 3/2006 | Harrold .................. | B65D 50/04 222/153.1 |
| 7,703,617 B1 | 4/2010 | Branson et al. | |
| 2005/0242055 A1 | 11/2005 | Oh | |
| 2007/0295763 A1 * | 12/2007 | Brunner ............. | B65D 41/0471 222/494 |
| 2010/0314418 A1 * | 12/2010 | Roth ....................... | A47G 19/32 222/207 |
| 2011/0282305 A1 | 11/2011 | Welser | |
| 2013/0105482 A1 | 5/2013 | Letica, II et al. | |
| 2015/0145170 A1 | 5/2015 | Valderrama et al. | |
| 2018/0029863 A1 * | 2/2018 | French ................. | B65D 47/265 |
| 2022/0323303 A1 * | 10/2022 | Ruggieri ................ | A61J 7/0053 |

FOREIGN PATENT DOCUMENTS

| | | |
|---|---|---|
| GB | 2335179 A | 9/1999 |
| WO | 02/076373 A1 | 10/2002 |

OTHER PUBLICATIONS

International Patent Application No. PCT/GB2020/051419 International Search Report dated Dec. 17, 2020, 6 pages.
International Patent Application No. PCT/GB2020/051419 Written Opinion dated Dec. 17, 2020, 18 pages.

* cited by examiner

DISPENSER

RELATED APPLICATIONS

This application is a national phase entry of International Patent Application No. PCT/GB2020/051419, filed Jun. 12, 2020, which claims priority from GB Patent Application No. 1909007.5, filed Jun. 24, 2019, the entire disclosures of which are incorporated herein by reference.

TECHNICAL FIELD

This invention relates to a dispenser. In particular it relates to a dispenser for dispensing part of the contents of a vessel in a convenient and safe manner.

SUMMARY

There are many situations where it is required to dispense a measured quantity of the contents of a vessel. For example, where the vessel contains a drug or medicine in liquid form it may be required to dispense a particular dose of that medicine to a patient, which may often be a child. There are many other types of dispenser which required measured quantities to be dispensed, such as contents which are mixed with other liquids in particular proportions or batches, for making purposes, concentrates which are diluted for producing drinks, which are mixed to form a large volume of a dilute or mixed substance for use in any other cleaning purposes, weed killing and so on.

Currently, when a medicine is dispensed for children it is often in liquid form and a bottle containing a relatively large amount is supplied to the child's carer or parent. The carer must then dispense a measured amount (2.5 ml or 5 ml, for example) to the child. This may be done by pouring known quantities of the liquid from the bottle into a teaspoon which is subsequently fed to the child. Alternatively a syringe arrangement may be used in which a desired, measured, amount of the medicine is extracted from the bottle using a syringe, and the syringe is then emptied in the child's mouth or into a vessel. These, and other methods currently known, can be messy, particularly as many children's medicines are "sticky" and can also lead to possible inaccuracy in measurement or dispensing. They also necessitate the bottle being kept at location close to the child for when the dispensing of the medicine is necessary. This might lead to the bottle being knocked over or the contents spilt, or could even be a safety risk if an older child is able to get hold of the bottle itself, and ingest an unsafe amount of contents, if the cap has been removed.

According to the present invention there is provided a measurable dispenser, comprising a first vessel containing a substance to be dispensed, a second, measurable, vessel, mounted on the first vessel, a one-way valve whereby fluid from the first vessel can be caused to move into the second vessel and retained therein virtue of the one-way valve, and wherein the second vessel is provided with one or more indicia indicating measured amounts.

The second vessel may be removable from the first vessel or fixed thereto.

The one-way valve is preferably between the two vessels, or provided on one or other vessel where it meets the other one.

Preferably, a tube is provided from the connection between the first and second vessel towards the bottom of the first vessel, whereby liquid to dispense is dispensed via said tube.

Preferably, the first vessel is squeezable in order to dispense liquid from the first vessel to the second vessel via one or more of the valves.

Alternatively, or additionally, the first and second vessels, whilst connected, may be inverted to dispense liquid from the first vessel to first to second vessel.

Alternatively, or additionally, a pump action mechanism may be provided to dispense liquid from the second vessel.

The first vessel may also be provided with a one-way valve at or towards its bottom, particularly, but not necessarily, when it is a squeezable container, to allow air to replenish liquid dispensed from the first vessel to the second vessel.

The second vessel may be rigid or may be flexible so as to be squeezable, such that squeezing of the second vessel can allow fluid to be dispensed from the first to the second vessel and/or to dispense the measured amounts of liquid from the second vessel, after it has been removed from the first vessel.

The apparatus may be used to dispense medicine, particularly medicine for children. The invention may be such that when an infant is put to bed, for example, a measured amount of a medicine is dispensed from the first to the second vessel and then the second vessel is removed from the first vessel and placed in a convenient location near to the child's bed. The child or infant's carer may then administer the measured amount of liquid from the second vessel when needed. Alternatively, an older child or is considered to be sufficiently responsible may self-administer the measured amount, with there being no risk of an overdose.

The measured amount of liquid may be dispensed from the top and/or bottom surface of the second vessel. The top surface may be open or may be have a removable lid. It may also have an additional one-way valve such that a person receiving the measured dose must suck at the top in order to obtain fluid via the one-way valve.

In some embodiments, the one-way valve is preferably provided at the bottom of the second vessel, although it may be provided alternatively, or additionally, at the top of the first vessel.

In many, but not all, embodiments of the present invention it is important that a person ultimately receiving the dispensed product does not receive too much of the product, or use of the product is carefully controlled where it is, for example, toxic or may be dangerous to health to ingest any quantity. In this case, it is very useful to be able to stop a child or other person from simply dispensing fluid themselves, an anti-tamper or child proof lock or cap mechanism is very useful for this. For example, where a product is a medicine it can be quite important that a child cannot dispense it themselves and that an adult may dispense it. Embodiments of invention therefore provide for an anti-tamper mechanism, which means that the contents can only be accessed once this has been opened. Note that child-proof mechanisms of the type described and encompassed by the present invention may be usefully used with the measurable vessel, as described herein, but may also have uses with many different types of vessels.

The present invention further provides a child-proof locking mechanism, for use on the vessel, comprising a bayonet ring adapted to be mounted relative to the vessel in such a way it can surround part of the vessel, be freely rotatable relative thereto in either direction but is retained thereon, the bayonet mechanism having at least one bayonet channel extending from an open, proximal, top surface of the ring to a closed distal end and having a cavity portion at or towards the closed distal end, and a resiliently deflectable tongue extending into the cavity and having an angled surface at its free end, and a top cover configured to locate between the bayonet ring and a surface of the vessel, and having on its outer surface at least one bayonet follower projection wherein, with the ring secured in place relative to a vessel, by holding the bayonet ring and vessel stationary relative to one another, the top can be rotated relative thereto such that a bayonet follower moves within the bayonet channel to deflect the free end of the deflectable tongue and then be retained within the cavity, to retain the cover relative to the ring vessel.

The measurable dispenser preferably includes a child-proof locking mechanism as disclosed.

In other non-limiting aspects, the present invention provides any of the following:

A. A measureable liquid dispenser vessel, that can be filled from the top or bottom, using a one or two way valve, such as a, with one or more leaflets, or a mechanical ball valve.

B. A measurable liquid dispensing vessel that can be filled from the top or bottom, using a one or two way valve, such as a, with one or more leaflets, or a mechanical ball valve that the liquid can be squeezed, or poured out, or drunk from the top or bottom of the vessel, or can be drunk by sucking out from a flexible teat.

C. A drinking vessel that can be held and stored on a sealed base, for using when needed.

D. A drinking vessel that can be filled using a squeezable, pump action or pouring from a child proof bayonet dispenser.

E. A drinking vessel that can be held on an existing child proof locking.

F. A drinking vessel that is locking top, that has a child proof locking bayonet ring, that can be filled from a one-way value, for example heart or ball valve.

G. A liquid dispenser vessel that is fixed to a squeezable dispenser bottle and can be squeezed to dispense the correct amount.

F. The valve may be a one leaflet type valve, of the type similar to a heart valve. It may be a three leaflet valve, or have more or less leaflets than three.

DESCRIPTION OF THE DRAWINGS

Embodiments of the present invention will now be described schematically, by way of example only, with reference to the accompanying drawings, in which.

DETAILED DESCRIPTION

Figure 1:
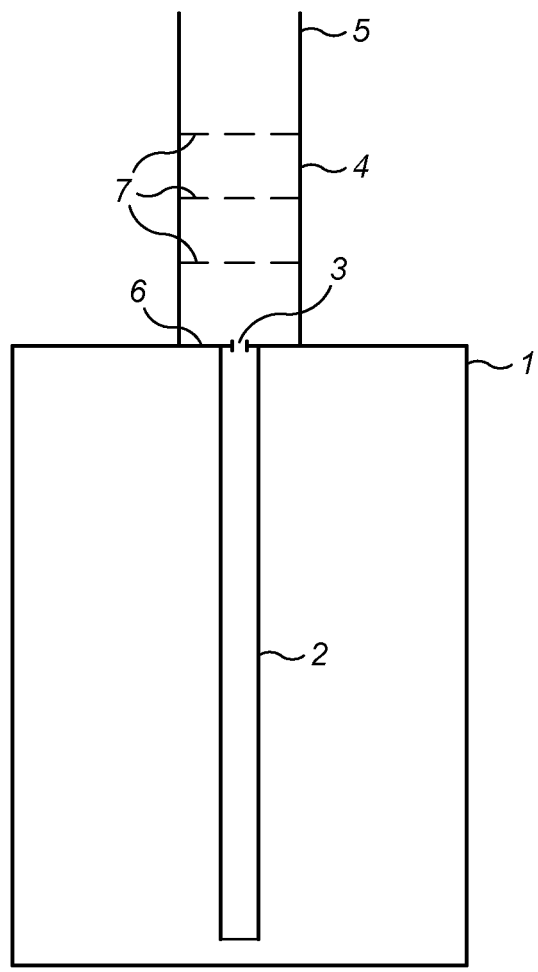
FIG. 1 shows a measurable dispenser.

FIG. 1 shows schematically a dispenser comprising a first vessel which may be a bottle having a liquid feed tube extending from a positioned towards the bottom of the vessel 1 to the top, where there is a one-way valve 3. This may be of different types such as a leaflet valve, a ball valve or otherwise.

A second (usually smaller) measurable, vessel 4 is mounted on top of the first vessel. This may be permanently attached thereto or may be removable therefrom. This will have at least side walls 5 and a base 6 and one or more indicia which may, for example, be line spaced vertically apart which indicates a measureable amount. The lowest line may represent a measurable amount of 5 ml so if the vessel is full up to the line there is 5 ml, the second line 10 ml and so on. The bottom 6 includes an orifice. This may be provided with the one-way valve 3, or the one-way valve may be provided in the bottom (main) vessel 1.

Where the measureable vessel is removable, this may be removable in many ways, for example it may simply to be clipped on (by a mechanism not shown), be screwed in place using cooperating threads, or by many other means.

In use, the sides of the vessel 1 are squeezed, which causes liquid to flow up tube 2, through the one-way valve 3 into the measurable vessel 4 to the desired amount. This causes a desired, measured, amount of liquid to flow into the measurable vessels which can subsequently be dispensed without fear of too much liquid being dispensed. It is prevented by the one-way valve from flowing back.

Figure 2:
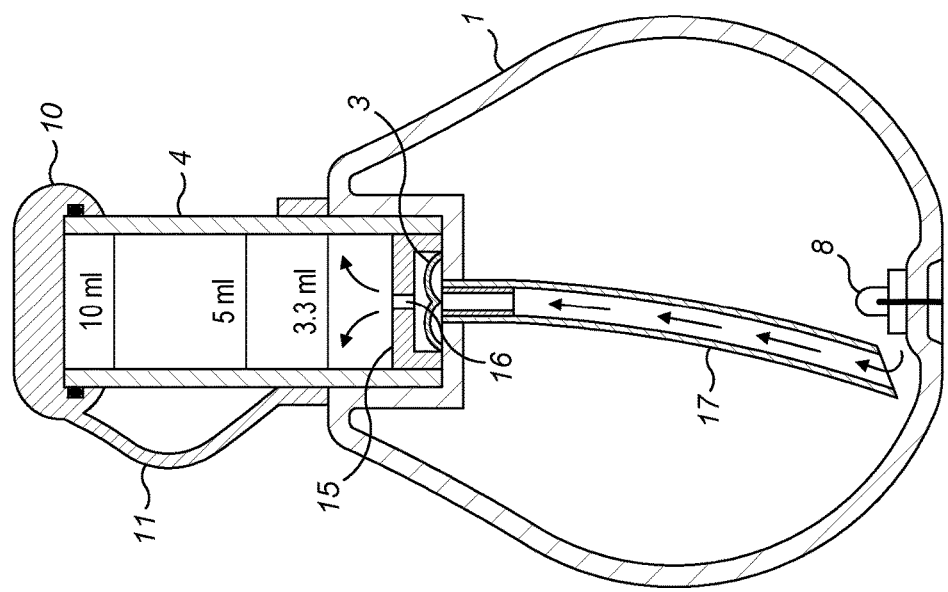
FIG. 2 shows measurable dispensers.

FIG. 2 shows an embodiment which similarly uses a squeezable main vessel 1 and a measurable vessel 4. In this embodiment, in addition to the one-way valve 3, a further one-way valve 8 is provided at or towards the bottom of the main vessel. This acts as an air vent which allows air in when the tube is squeezed to replenish liquid dispensed into the second vessel 4. The embodiment of FIG. 2 also includes a cap 10 which secures the top of measurable vessel 4 to avoid spillage. The cap is shaped and configured to simply snap over the top of the vessel and is held in place by a cord 11, which may be an integral part of the bottle that is otherwise secure at its other end to the bottle, such that the cap when not in place over the top of measurable vessel 4, is not mislaid. Thus, the main vessel 1 may be squeezed to obtain a measured amount of liquid into the measurable vessel 4 and then when it is desired to be dispensed the cap 10 is removed and the measured amount may be poured from the measurable vessel 4.

Figure 3:
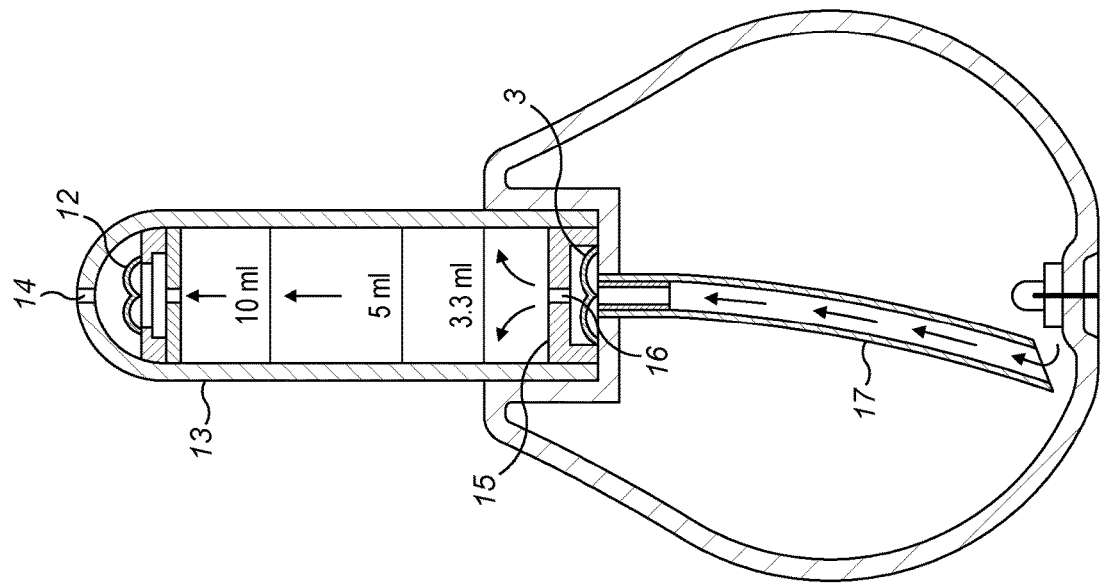
FIG. 3 shows measurable dispensers.

FIG. 3 shows a similar embodiment but in this case the measurable vessel includes, towards its top end, a further one-way valve 12 and is closed rather than open at its top edge. In the embodiment shown the top is a closed generally dome shape top 13 having a orifice 14. In this case liquid may be dispensed from the measurable vessel 4 by squeezing, which causes a measured amount of liquid which has been dispensed into the measurable vessel to be dispensed through one-way valve 12 into another vessel.

Both embodiments of FIGS. 2 and 3 also show a cover 15 mounted on top of the main one-way valve 3, which has a small orifice, preferably at its centre, through which when liquid has been passed through the one-way valve may flow into the measurable vessel. This is shown at orifice 16. This cover is not essential but it is useful to protect the delicate valve, particularly where there is a leaflet type valve, and to provide a controlled flow into the measurable vessel. It reduces the chance of the valve getting blocked by debris or particles in the liquid.

Figure 4A:
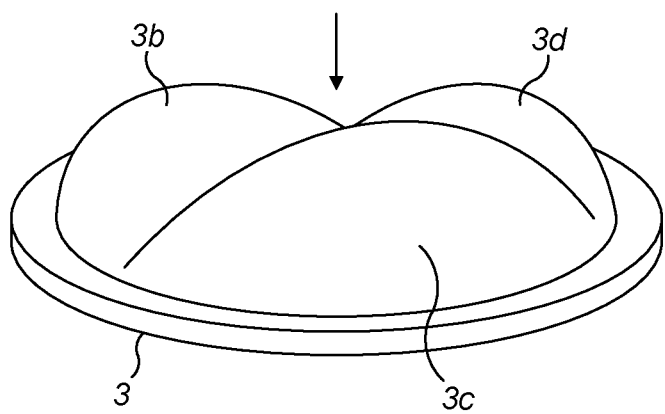
FIGS. 4(a)-(c) show a leaflet valve.
Figure 4B:
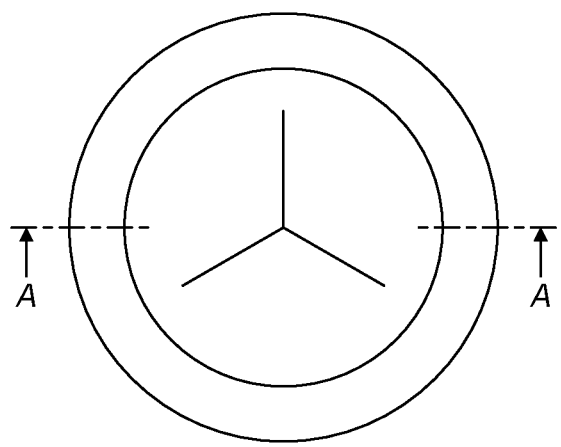
Figure 4C:
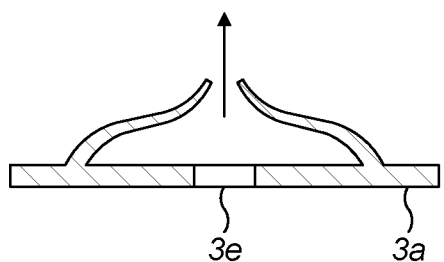

FIGS. 4(A), 4(B), and 4(C) show schematically, a leaflet-type valve, having two or more leaflets (three are shown in the embodiment shown) which open relative to another when the flow is bottom to top but close when attempt to flow is from top to bottom, thus only allowing liquid to flow in one direction. This mechanism will of course be known from the mechanism of, for example, heart valves which operate in a similar manner. The valve may comprise a base disc 3a, having a central orifice 3e, and three leaflets 3b, 3c and 3d. Other designs may be used, however.

Figure 5:
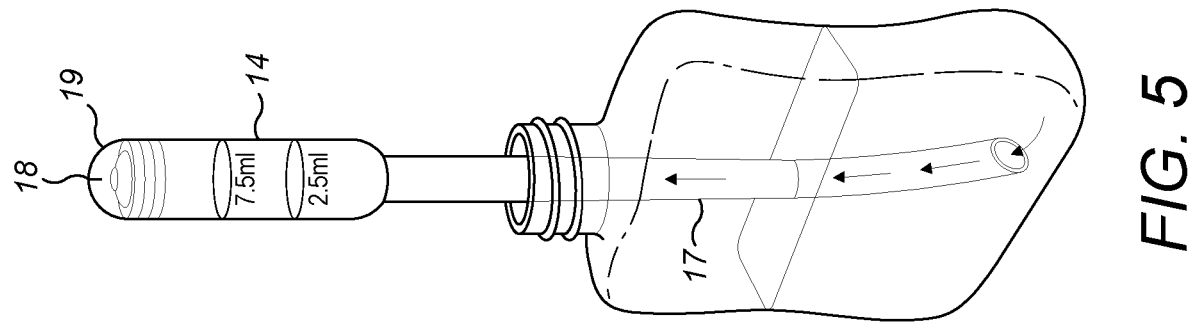
FIG. 5 shows a measurable vessel.

FIG. 5 shows an alternative embodiment in which the liquid feed tube 17 leads to a relatively narrow, squeezable measurable vessel, such that after the vessel has been filled with a measured amount of liquid, the measurable vessel 4 can be removed and then by squeezing the measured amount can be dispensed through its bottom. This vessel is closed at its top 19, typically a domed top which has an air vent 18, such that when it is squeezed liquid flows out through the bottom and air is replenished through the air vent 18.

Figure 6:
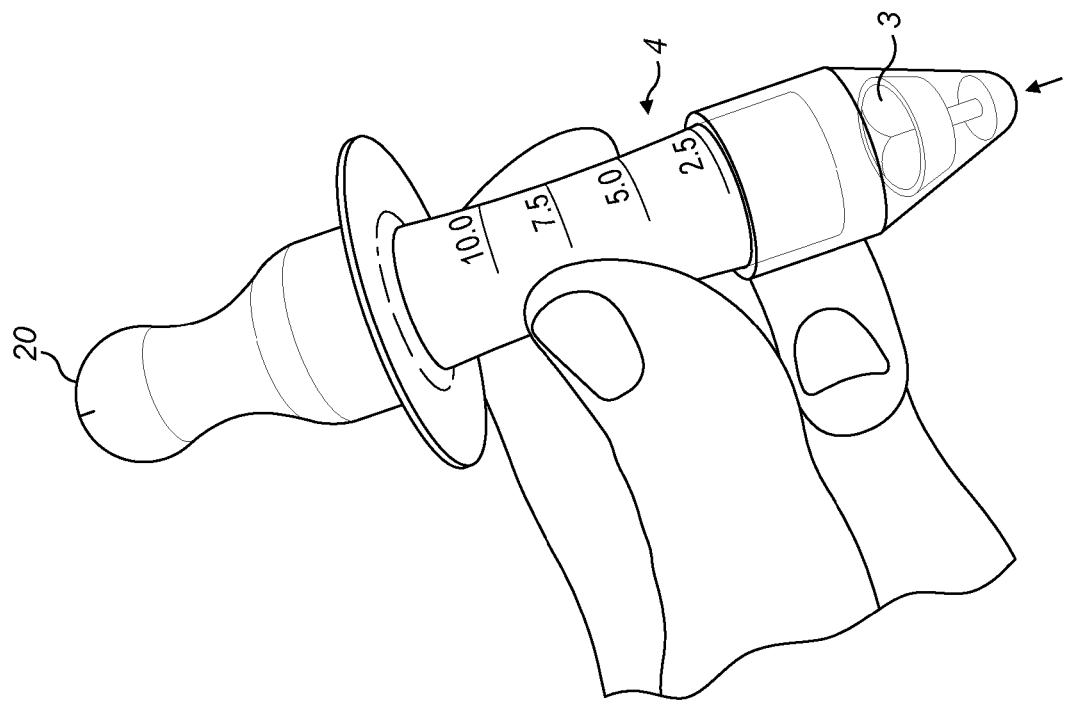
FIG. 6 shows a measurable vessel.

FIG. 6 shows an alternative embodiment and this is shows the measurable vessel which, after it has been filled through its one-way valve 3, can be squeezed to dispense liquid through a teat 20. This can of course be used for feeding a young infant or baby.

Figure 7:
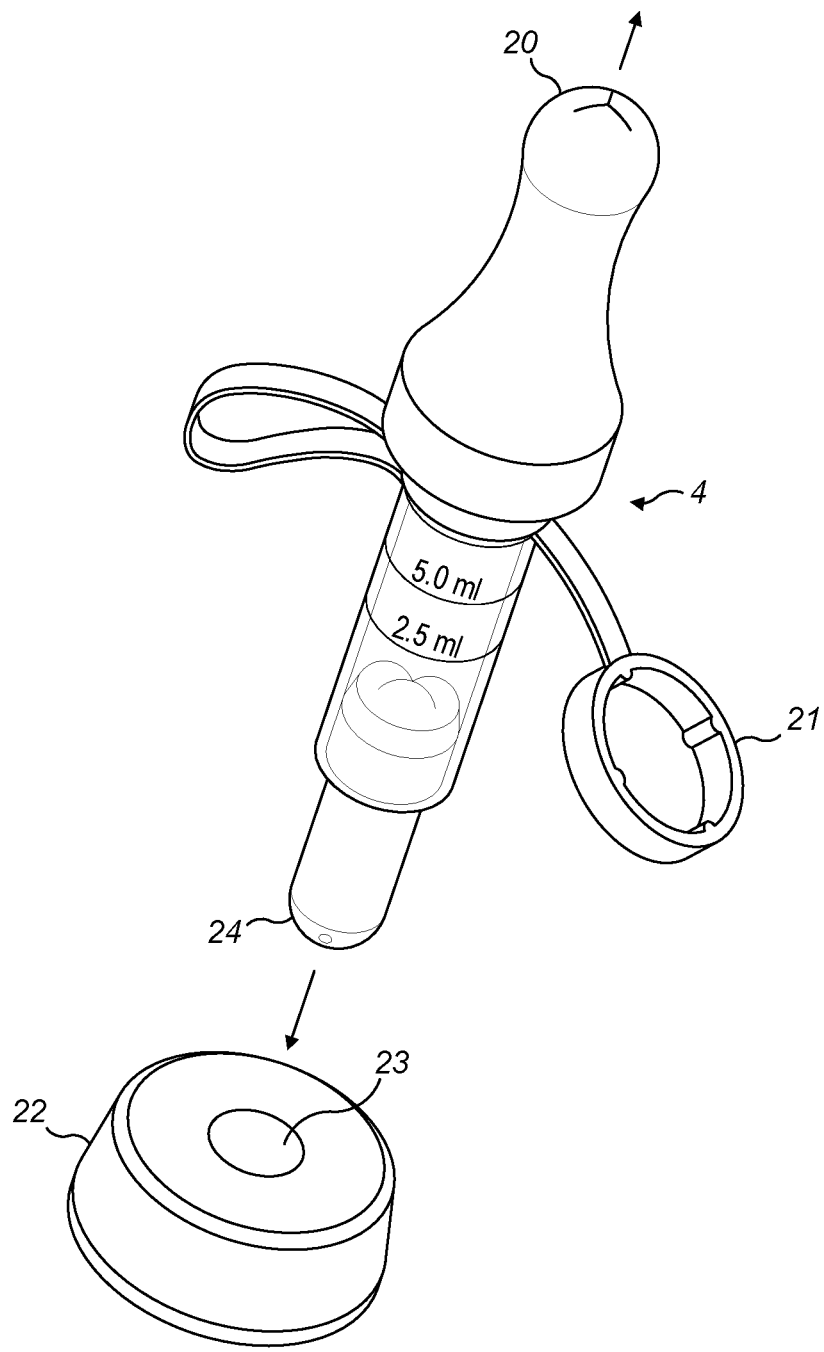
FIG. 7 shows a measurable vessel with a stand.

FIG. 7 shows an embodiment similar to FIG. 6 in which a lid 21 is attached by a cord and which serves to close the top of the teat for hygiene. This also shows a base 22 that may be useful to store the measurable vessel 4 after it has been filled from a main vessel (shown in this figure or FIG. 6) and ready for use. Thus, it may be stored on this basis, on a bedside table, for example, filled with a measured amount of liquid. The base comprises a frusto-conical body 22, having a cavity 23 suitable for receiving the lower end 24 of the measurable vessel 4 and holding it in an upright position.

In some embodiments, instead dispensing the liquid by squeezing the main vessel, more rigid or totally rigid vessels may be used, and a pump action dispenser may be used. This may be used with any of the embodiments of the present invention. An example is shown later on, but a pump action dispenser, is commonly known, and often used, for example, on soap products and similar, instead of squeezing a side vessel the upper vessel is mounted in such a way that it can pushed down to operate a spring leaded pump action which causes liquid to flow through the one-way valve into the upper measurable vessel. Many different types of pump action dispensers are known.

In many, but not all, embodiments of the present invention it is important that a person ultimately receiving the dispensed product does not receive too much of the product, or use of the product is carefully controlled where it is, for example, toxic or may be dangerous to health to ingest any quantity. In this case, it is very useful to be able to stop a child or other person from simply dispensing fluid themselves, an anti-tamper or child proof lock or cap mechanism is very useful for this. For example, where a product is a medicine it can be quite important that a child cannot dispense it themselves and that an adult may dispense it. Embodiments of invention therefore provide for an anti-tamper mechanism, which means that the contents can only be accessed once this has been opened. Note that child-proof mechanisms of the type described and encompassed by the present invention may be usefully used with the measurable vessel, as described herein, but may also have uses with many different types of vessels.

Figure 8:
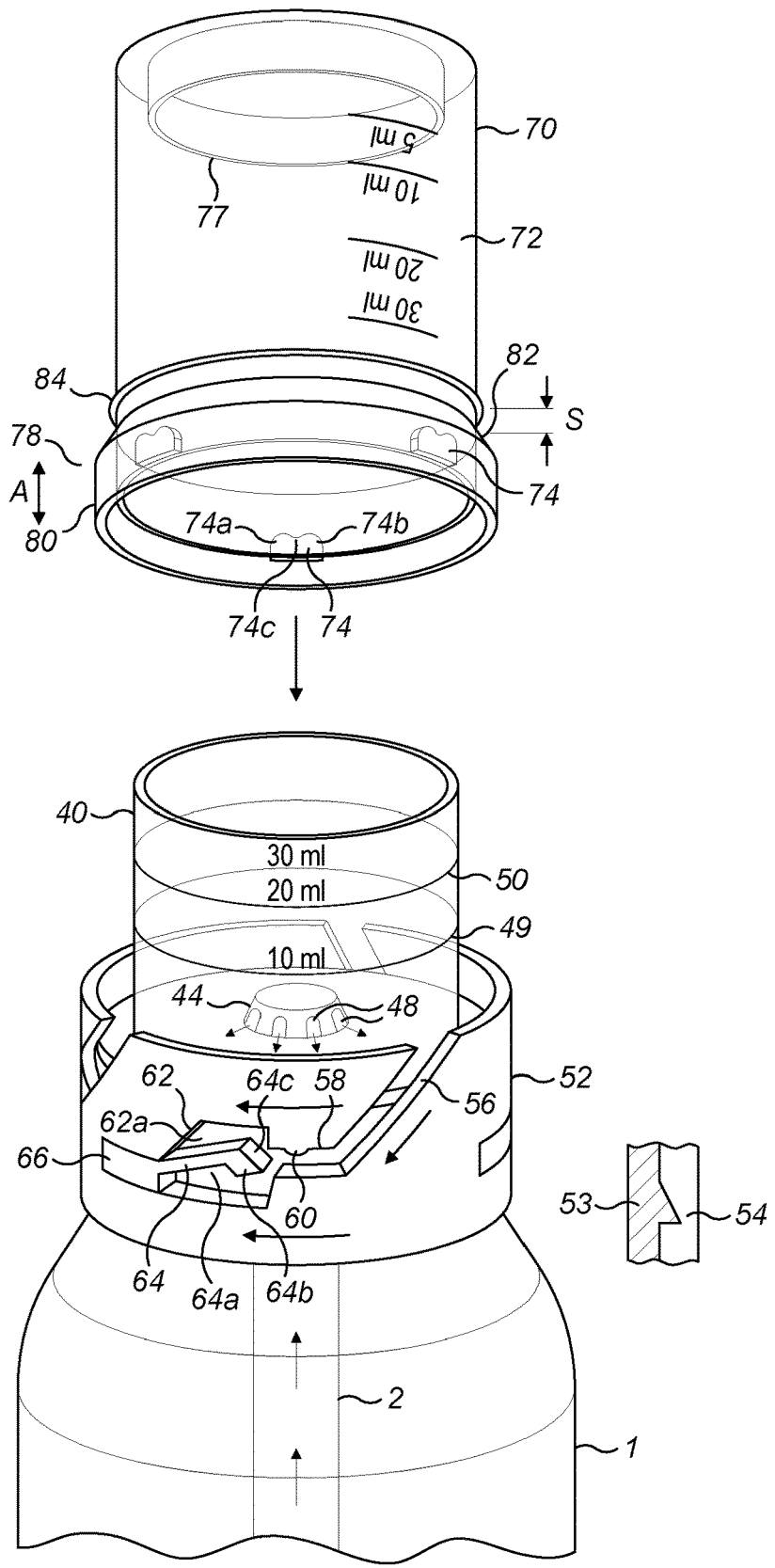
FIG. 8 shows a measurable dispenser with a child-lock.
Figure 9:
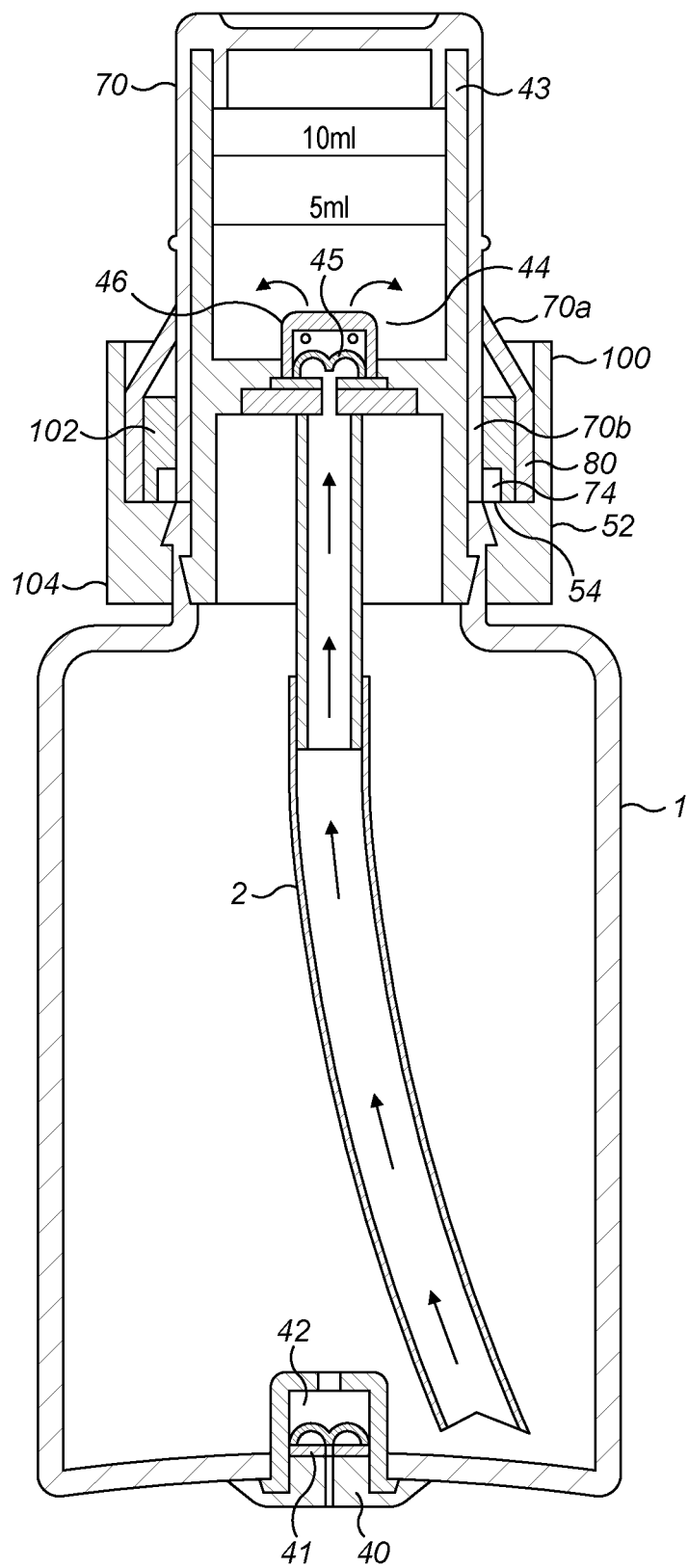
FIG. 9 shows a cross-section of a measurable dispenser with a child-lock.
Figure 10A:
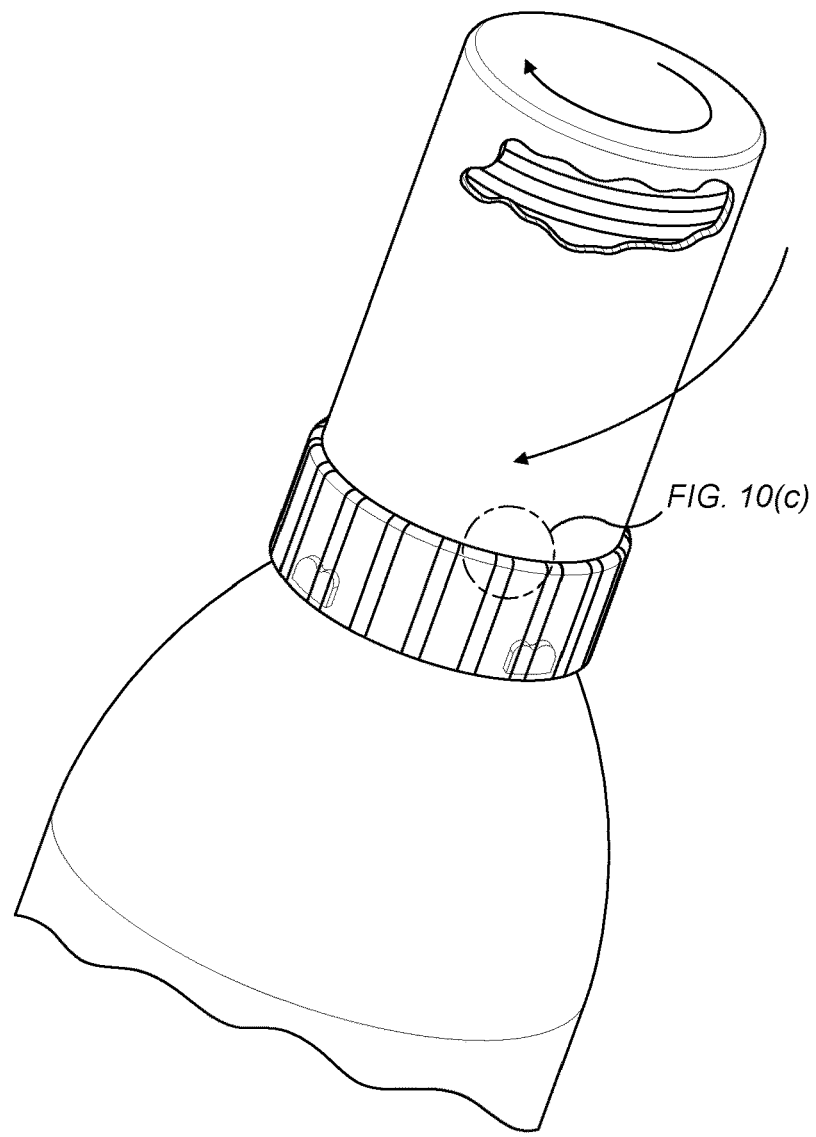
FIGS. 10(a)-(d) show details of a child-lock mechanism.
Figure 10B:
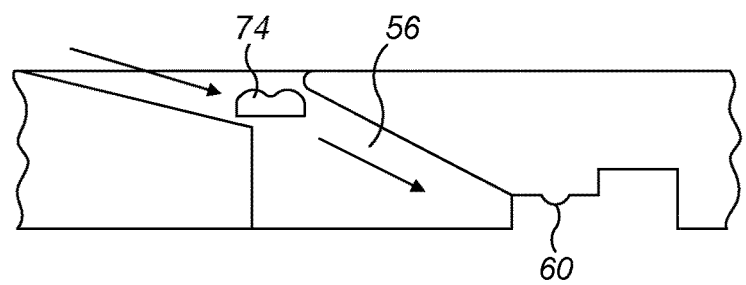
Figure 10C:
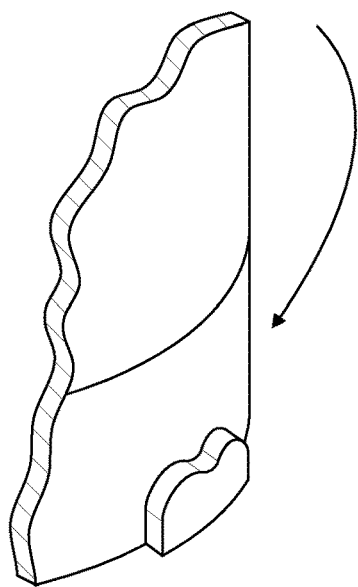
Figure 10D:
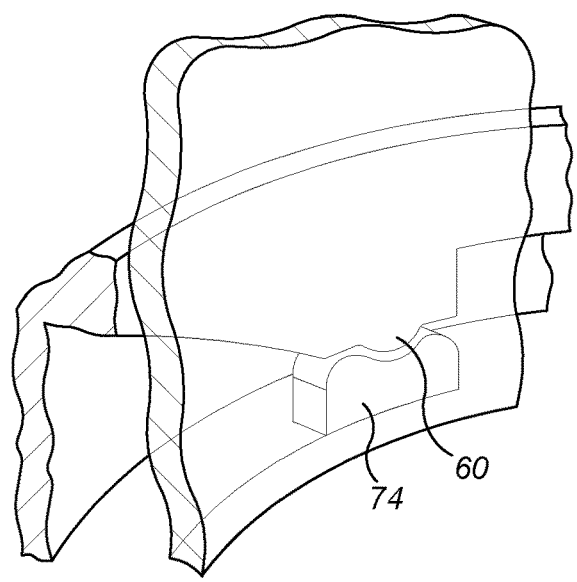

One example of a child-proof anti-tamper mechanism according to an embodiment of the present invention is shown in FIGS. 8 and 9.

FIG. 8 shows the top part of the main vessel 1, which also includes the liquid feed tube bayonet and a one-way valve 40 at its bottom. This is of the type which, in addition to the leaflets 41, also includes a cover 42.

In this embodiment, the upper measurable vessel 43 is fixed to the main vessel but it may of course be removable. In this and in other embodiments, this may be a single structure made of one item, or may be separate items that are fixed together in any convenient way.

The two are connected by a one-way valve 44. The particular valve 44 shown in the embodiment of FIGS. 8 and 9 comprise a plurality of leaflets 45 enabling the one-way action and a cover 46. In this case the cover is solid at its top (ie does not have an orifice at its top) but instead has a series of orifices or outlets 47 at a side part of the cover (seen most clearly in FIG. 8). Thus, when the main vessel is squeezed liquid is feed through the pipe 2 through the leaflet and then dispensed generally laterally through the holes or outlets 48 into the measurable vessel 43. The measurable vessel includes a number of indicia 49, 50 indicating measured values of liquid.

The child-proof cover, in this case, includes a locking bayonet ring which includes a plurality (four in this case, equally spaced, but there may be only one or more) of bayonet channels extending from a top end. The bayonet ring is mounted to the neck part of the vessel (the neck being the part generally between the main and measurable fixed vessels) in such a way that is retained thereon but can freely rotate. This may be done by the neck including one or more ribs 53, as shown in FIG. 8 where the bayonet ring 52 has a recess 54, or a slot, which when pushed down can deform to allow the ring to move over this ring 50 and be located in place such that the bayonet ring, once in place, can freely rotate in either direction relative to the vessel but cannot easily be removed. Other mechanism for locating a ring so that it can be freely rotated in either direction, but not removed, will be apparent. This ring may instead simply be deformable or resiliently deformable to locate against the ring.

As is shown in the figure the bayonet channel has its proximal end opening at the top of the vessel, and a first part 56 that extends from this generally at an acute angle to the top reference surface of the ring. A second part 58, which is generally horizontal to the opening in the figure, but may not necessarily be so (where horizontal generally parallel to the main of the top of the ring) forms channel 58 which has a restricted, narrower, waist 60. From here the channel leads to a wider part 62 or cavity which has, extending into it, a resiliently deflectable tongue or spring member 64 which is mounted at the closed distal end 66 and which extends into channel 62. The deflectable tongue is of smaller width than the channel and can be resiliently deflected in the longitudinal direction of the ring (ie in a direction perpendicular to the plane of the top and bottom of the ring). It includes a first part 64a extending from the distal of the bayonet channel into the recess 62 and then a second part 64a which may extend generally downwardly (the first part 64a extending generally upwardly) but which has an angled face 64c positioned near the part of the chancel where wider channel meets narrower channel 58.

Thus, it will be appreciated that when a bayonet follower moves in a generally horizontal direction relative to the bayonet between parts 58 and 62 it will cause the deflectable tongue 64 to move downwardly as it impinges upon the angled surface 64c until the follower is located within the upper part 62a of the cavity 62 above the tongue in locating it in place. As shown, in one embodiment 4, similar bayonet channels are provided on the bayonet ring 52. The follower is retained in the cavity and movement of it would also move the bayonet ring.

The mechanism also comprises a top cover portion 70. This may also act as a measurable vessel so shows measured volumes of liquid. At its open end (which will be at the bottom when the bayonet mechanism is placed) is provided a number of bayonet followers or protrusions 74. In the embodiment shown these are each generally M-shaped, having two "peaks" 74a, 74b and a trough 74c between them at their upper surface. Typically, the same number of bayonet followers 74 will be provided as the number of bayonet rings. Typically this will be four and it will be equal distance around the circumference of the ring at or towards its (bottom) open end. The upper vessel also includes a rim seal 77 at its closed end which may be made of plastic or other material which can seal again the top surface of the fixed measurable vessel 43 to stop liquid leakage.

The top container 70 may also in some embodiments, but not necessarily all, include a slidable rim 70a which comprises a circular part having a generally cylindrical body 80 and tapered towards its end 82 (ie it is generally frusto-conical) and this is retained in place between two ribs of which the first one 84 is shown and the second one is not shown, such that it can slide by a restricted amount S to cover the projections 74 or uncover them. This is useful to provide a shield cover structure when this top is itself used as a measurable vessel.

To operate the child-proof locking mechanism, with the bayonet ring 52 in place and freely rotatable relative to the vessel, the disc ring must be held by a user and the vessel also held such that these cannot move relative to each other. The upper top part 70 is then moved over the upper vessel 43 until the bayonet follower 74 engages into the open parts of the bayonet channels 56. Part 70 is then moved downwardly and rotated (clockwise in the embodiment shown) until the bayonet follower 74 has within to part 58, 60 of the channel, such that the trough 74c locates within the narrowed waist 60. This forms an intermediate detent position. It is then held in place here. Further clockwise rotation of the part 70 relative to the ring and vessel then causes the follower 74 to impinge upon the free end of tongue 64, causing this to be displaced downwards. This enables the follower to move into the recess 62a and be locked in place, the tongue snaps upwards and retains the flow.

The top 70 is thus secured relative to the ring and when the vessel itself is released rotation of one or other of the ring or top will cause these to rotate together. They cannot be easily disassembled from each other. Thus the contents of the measurable vessel 43 are secured and cannot be accessed. In order to open the container and release the child-proof assembly the ring and vessel must again also be held together such that they cannot rotate relative to one another. The upper top vessel 70 must then be pushed downwardly in order to downwardly deflect tongue 62 and then rotated in order to free the follower 74. This moves into a transient position where the followers are again held in place by waste 60 and then further relative movement between the top 70 and the ring 52 causes the bayonet followers to be released and to follow the channel to its opening, whereby the parts are released and the top may be removed from the ring and vessels.

As shown in FIG. 9, the bayonet ring most preferably comprises two rings, an outer ring 100 and an inner ring 102. These are joined by a common circular base 104 which is secured to the bottom, such that it secured thereto but can still freely rotate. The bayonet channels are provided in the inner ring 102 and the figure shows a follower 74 located within a bayonet channel 52. The bayonet ring is preferably a single structure, eg a moulded plastic structure.

The outer ring does not include bayonet channels and is therefore generally solid. It is most preferably level with or above the top of the inner ring 102, as shown in FIG. 9.

In use, then, it is seen that the bayonet ring, which includes both inner and outer rings 102 and 104 respectively, is first mounted in position upon the bottle (or the top most part of the bottle, which may be a top projection of reduced width compared to the rest of the bottle) by being secured over an appropriate rim or other method, such that it is secured but can freely rotate.

The bayonet ring and the main vessel are then held such that they cannot move relative to one another. The top vessel 70, which includes the rim 70a is then located. This rim is preferably in the extended (downward) position, such that it has protects the lugs and also helps to locate them. As the upper vessel 70 is moved downwards the followers locate into the tops of the bayonet channel and then the top vessel can be rotated and move downwardly, such that the followers engage and move within the channel as described above. Once located in place the top vessel is secured to the bayonet ring and can be moved therewith relative to the main vessel but without the top part being easily removable, thus providing a child-proof or anti-tamper mechanism.

Thus, the body of the top vessel, which bears the followers/lungs, sits inside the inner ring, so that the lugs can locate within the bayonet channels, and the slidable rim 70a sits between the inner and outer rings. This is therefore sized accordingly to have an inner diameter between the outer diameter of the inner ring and an inner diameter of the outer ring.

In order to subsequently to remove the top vessel the bayonet ring and main vessel must again be held together and the top vessel moved relative to disengage the bayonet followers from the bayonet channels.

The rim 70a also provides sealing to seal the gap between the inner and outer bayonet rings and thus reduce the amount of liquid or debris which could get between these two and might possibly block the bayonet rings. Thus, the rim not only shields and protects the bayonet followers it also provides some protection against debris spoiling the bayonet mechanism.

Any measured amount of liquid in the fixed measurable vessel 43 may then be dispensed directly, or may be poured into the top part 70 (when inverted obviously) for further dispense.

Other mechanisms of a deflectable tongue and bayonet channel, or other means, may be used other than the specific one described and shown.

FIG. 10 shows the mechanism in a little more detail and shows the follower 70 travelling through the channel 56. The figure (which is in exploded sections) also shows the positon when the follower 74 is latched into the narrowed waste part 60 of the channel.

Figure 11:
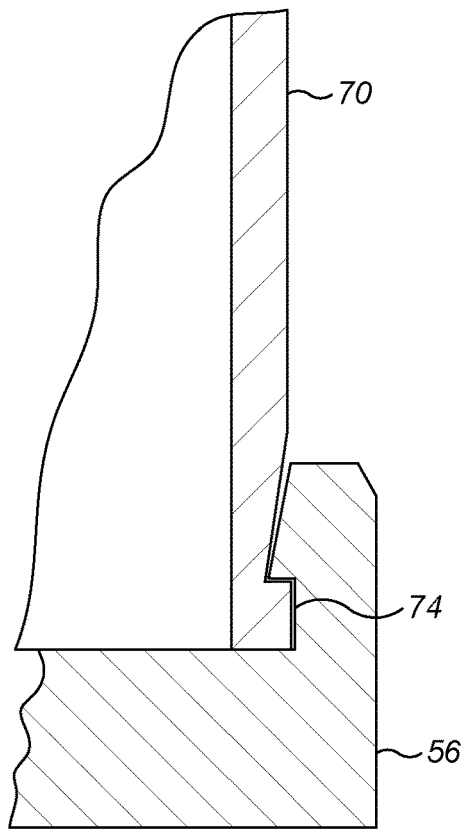
FIG. 11 is a partial cross-section of a bayonet ring attached to a vessel.

FIG. 11 is a partial cross-section of an embodiment showing a ring 56 and a top 70 and indicating how the protrusion locates the two parts together.

Figure 12:
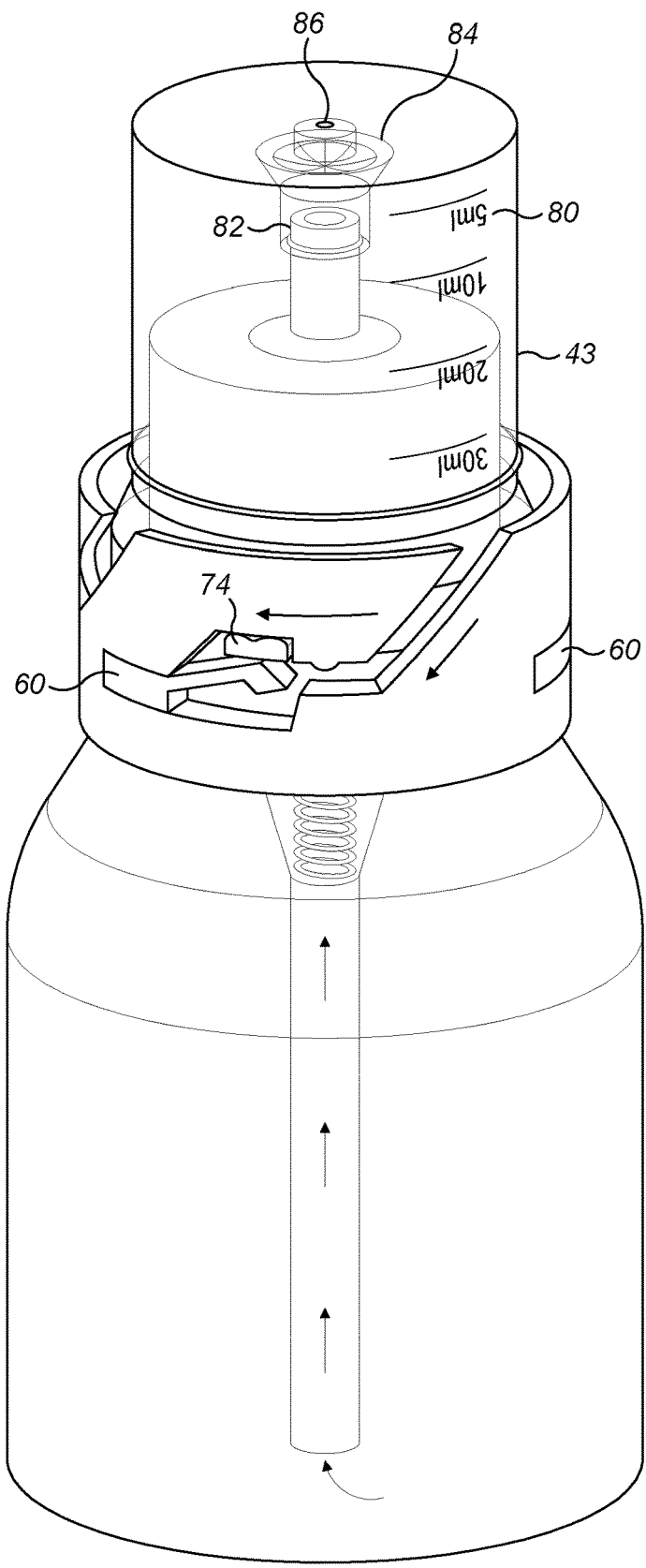
FIG. 12 shows a measurable dispenser with child-lock.
Figure 13:
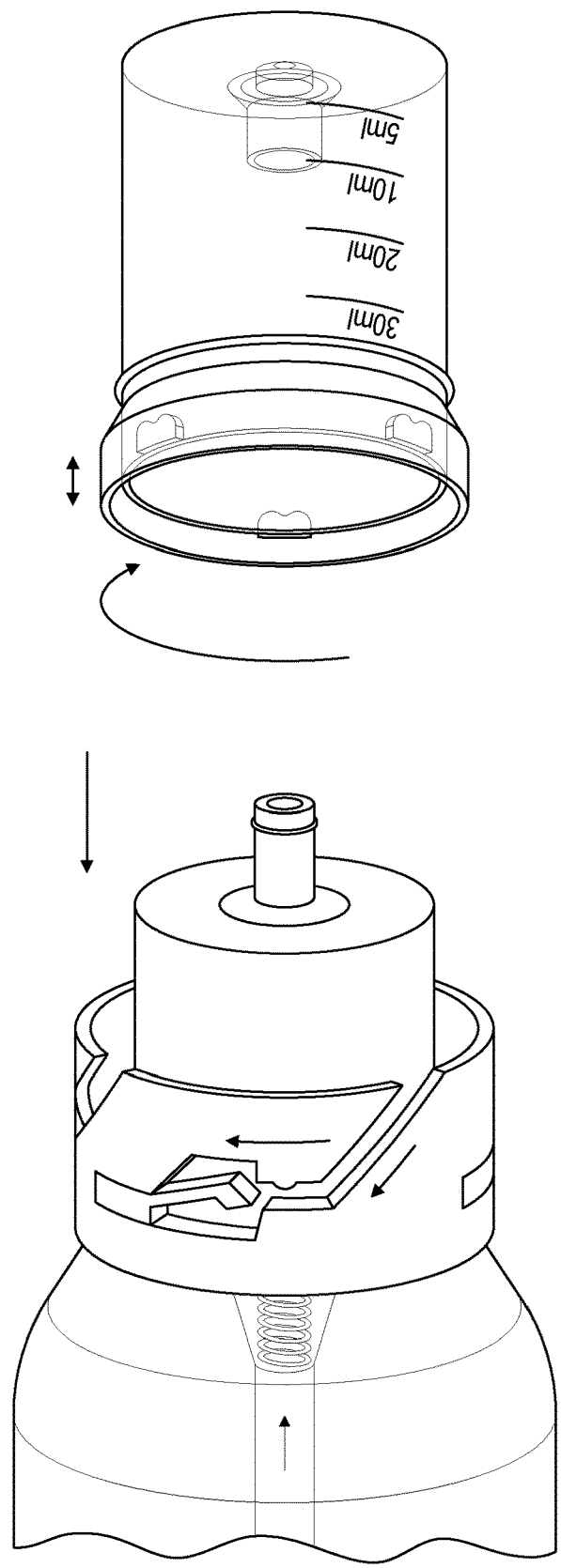
FIG. 13 shows a measurable dispenser with child-lock.
Figure 14:
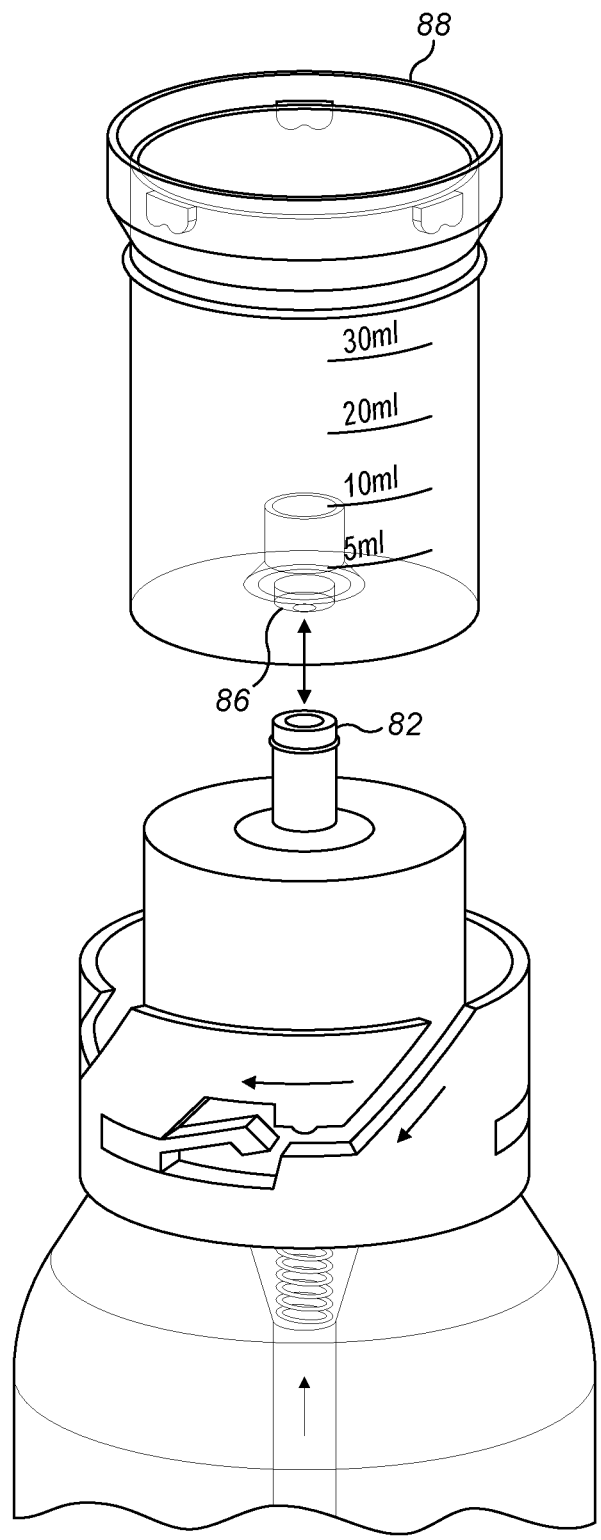
FIG. 14 shows a measurable dispenser with child-lock.

FIGS. 12 to 14 show an alterative embodiment in which, instead of a fixed (non-removeable or suitable non-removable) measurable vessel attached to the main vessel, there is a lid or top part 43 of the child-proof mechanism which acts as the measurable vessel. The version shown includes a pump action dispensing. It would be appreciated, as stated previously, that a pump action mechanism may be used in any embodiment of the invention.

The child-proof mechanism is the same as in the embodiment of FIGS. 8 and 9, but in this case the indicia 80 on the top vessel are of course inverted. The liquid feed pipe leads to a nozzle 82 which extends out of the top of the main vessel. The closed end 84 of the top, measurable, vessel includes an assembly which can seal against nozzle 82 and this is shown at 84. This includes a further one-way valve 86 opening to the top of the container. Thus, when the vessel is applied and rotated in a locked position the pump nozzle is sealed and then liquid cannot escape.

FIG. 13 shows the assembly of FIG. 12 when the child-proof mechanism is released to remove the upper vessel. This then breaks the seal with the top of the nozzle 82.

Figure 16:
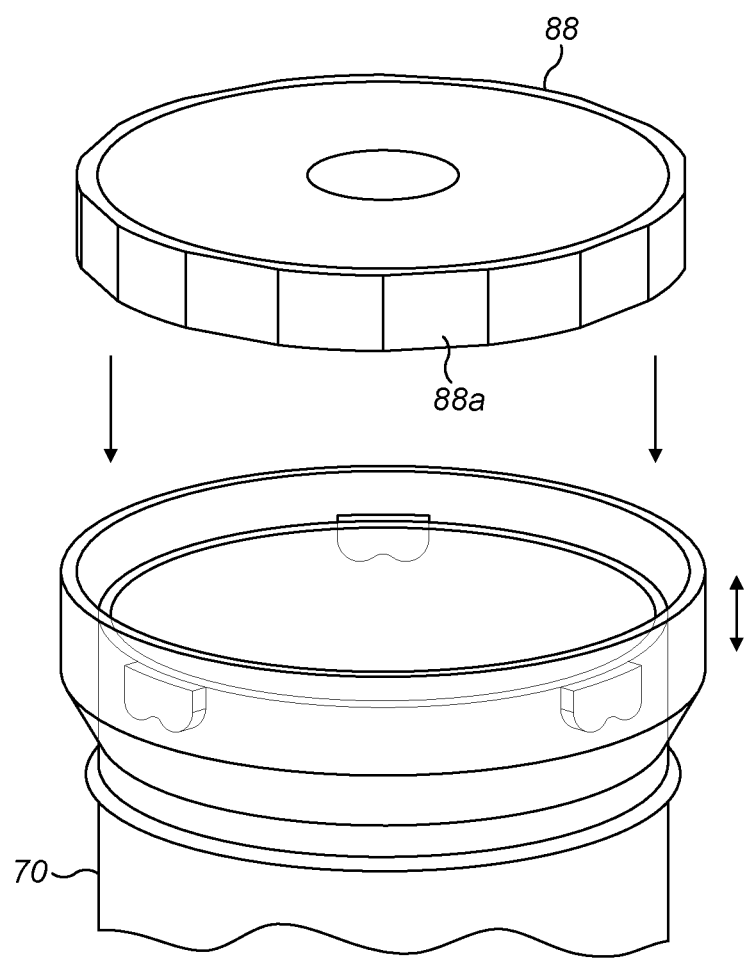
FIG. 16 shows detail of a vessel and lid.

As shown in FIG. 14, the top vessel 43 can then be inverted and placed into position upon the pump nozzle 82. By pumping down this then allows liquid to flow through the nozzle, through one-way valve 86 and into the measurable vessel. This figure also shows a separate lid 88 fixed upon the movable rim and this may simply be a generally cylindrical body made of plastic, for example, which clips over in order to provide a lid in case the vessel is knocked over or spilled. As shown in FIG. 16, the lid 88 may be formed with a plurality of flats 88a around its periphery. These enable air to escape and therefore act as vents as this provides gaps between the inner circumference of vessel 70 (or rim 70a) and the lid. This may be necessary to enable the vessel to fill, as it enables air to escape as liquid is drawn in.

Figure 15:
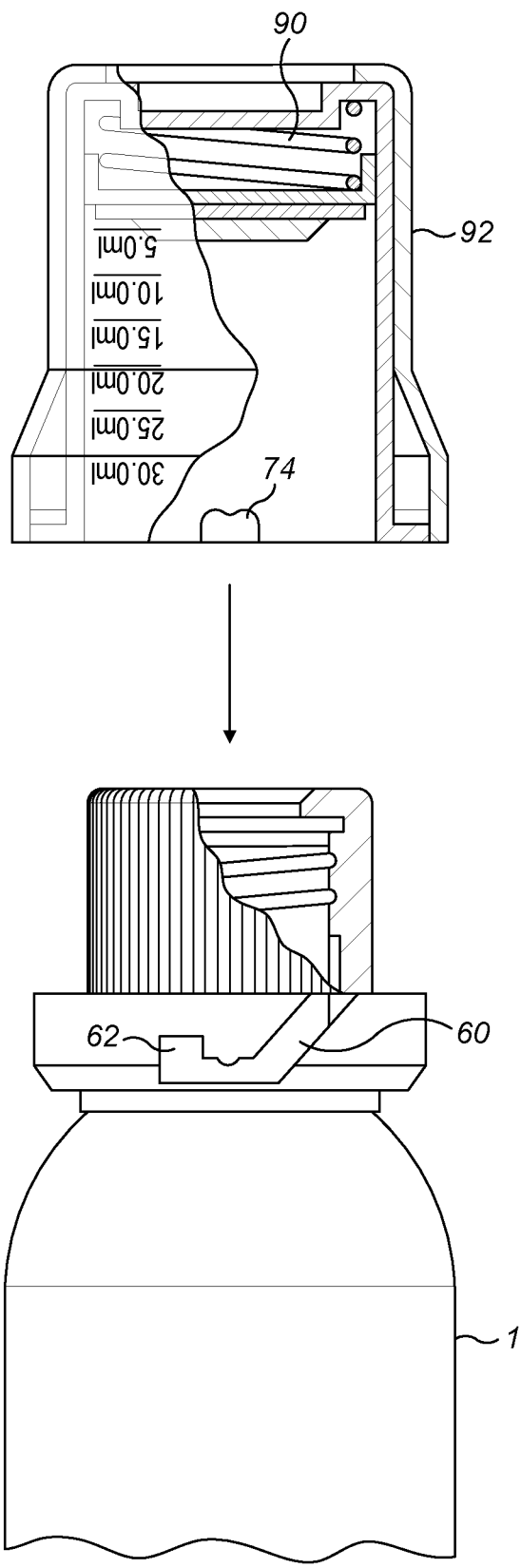
FIG. 15 shows an alternative dispenser with a child-lock.

FIG. 15 shows an alternative embodiment. Instead of a deflectable tongue 60 a spring loaded mechanism is used in order to locate the protrusion 74. In this embodiment the upper vessel includes a spring 90 at its top end (ie the end removed from the main vessel 1). Thus the embodiment provides a spring loaded rim seal, bayonet ring 62 and outer cover 90. When the outer cover is pushed down the protrusion 74 moves down and across into the bayonet channel 60. When the protrusion 74 lies within the distal enlarged cavity 62 pressure is released and the spring pulls the body, including the protrusion 74 upwards and thus locks in place in the cavity 62.

Again, the bayonet ring must be held together with the main vessel for no rotation therebetween when the upper vessel is rotated relative to those in order to activate the child-proof mechanism.

The invention claimed is:

1. A measurable dispenser, comprising
a first vessel for containing a substance to be dispensed,
a second, measurable, vessel, removably mounted on the first vessel,
a one-way valve whereby fluid from the first vessel can be caused to move into the second vessel and retained therein virtue of the one-way valve, and wherein the second vessel is provided with one or more indicia indicating measured amounts, and;
a child-proof locking mechanism, comprising a bayonet ring adapted to be mounted relative to the first vessel in such a way it can surround part of the vessel, be freely rotatable relative thereto in either direction but be retained thereon, the bayonet ring having at least one bayonet channel extending from an open, proximal, top surface of the bayonet ring to a closed distal end and having a cavity portion at or towards the closed distal end, and a resiliently deflectable tongue extending into the cavity and having an angled surface at its free end, wherein the bayonet ring comprises an inner ring and an outer ring joined by a common circular base, and the bayonet channel is provided on the inner ring;
wherein the second vessel is provided with a part of the child-proof locking mechanism having on its outer surface at least one bayonet follower projection; and
wherein, with the bayonet ring secured in place relative to the first vessel, by holding the bayonet ring and the first vessel stationary relative to one another, the second vessel can be rotated relative thereto such that the bayonet follower projection moves within the bayonet channel to deflect the free end of the deflectable tongue and then be retained within the cavity, to retain the second vessel relative to the bayonet ring.

2. The measurable dispenser as claimed in claim 1 where the second vessel is removable from the first vessel.

3. The measurable dispenser as claimed in claim 1 wherein the second vessel is fixed to the first vessel.

4. The measurable dispenser as claimed in claim 1 wherein the one-way valve is between the two vessels, and is provided on one or other of the vessels at the point where liquid can flow between them.

5. The measurable dispenser as claimed in claim 1 wherein a tube is provided from the connection between the first and second vessels towards the bottom of the first vessel, whereby liquid to be dispensed is dispensed via said tube.

6. The measurable dispenser as claimed in claim 5 wherein the first vessel is squeezable to dispense liquid.

7. The measurable dispenser as claimed in claim 1 wherein a pump action mechanism is used to dispensed liquid from the first to second vessel, wherein the second vessel is mounted in such a way that it can pushed down to operate a spring loaded pump action which causes liquid to flow through the one-way valve into the second measurable vessel.

8. The measurable dispenser as claimed in claim 1 wherein the one-way valve is provided towards a bottom surface of the first vessel.

9. The measurable vessel as claimed in claim 1 wherein a dispense tube is provided to dispense fluid from the first vessel into the second vessel, the tube terminating in a nozzle which extends out of the first vessel, and wherein the second vessel receives fluid from the nozzle and has a seal at its closed end for sealing the nozzle to prevent fluid leakage when the second vessel is located in place by the bayonet ring.

10. The measurable vessel as claimed in claim 9 wherein the second vessel has a one-way valve at the end that has the seal, such that after the second vessel is removed from the bayonet ring the second vessel can be inverted and then placed relative to the nozzle such that liquid can be dispensed through the tube, nozzle and one-way valve into the second vessel in an inverted position.

11. The measurable dispenser as claimed in claim 1 wherein the one-way valve includes a valve assembly and a cover having one or more orifices therein.

12. The measurable dispenser as claimed in claim 11 wherein the cover includes an unperforated top part and a plurality of orifices at a side portion, such that liquid passing through the one-way valve mechanism is dispensed laterally.

* * * * *